United States Patent
Chauvet et al.

(10) Patent No.: US 10,169,394 B2
(45) Date of Patent: Jan. 1, 2019

(54) MANAGING DATA SETS OF A STORAGE SYSTEM

(71) Applicant: International Business Machines Corporation, Armonk, NY (US)

(72) Inventors: Philip R. Chauvet, Tucson, AZ (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 14/297,128

(22) Filed: Jun. 5, 2014

(65) Prior Publication Data

US 2015/0356124 A1 Dec. 10, 2015

(51) Int. Cl.
*G06F 17/30* (2006.01)
*G06F 3/06* (2006.01)

(52) U.S. Cl.
CPC ...... *G06F 17/30371* (2013.01); *G06F 3/0608* (2013.01); *G06F 3/0641* (2013.01); *G06F 3/0673* (2013.01); *G06F 17/30082* (2013.01); *G06F 17/30303* (2013.01)

(58) Field of Classification Search
CPC .............................................. G06F 17/30371
USPC ........................................................ 707/692
See application file for complete search history.

(56) References Cited

U.S. PATENT DOCUMENTS

| | | | |
|---|---|---|---|
| 6,317,433 B1* | 11/2001 | Galand | H04J 3/1688 370/395.2 |
| 8,713,224 B2 | 4/2014 | White et al. | |
| 2004/0193618 A1 | 9/2004 | Yaeger | |
| 2007/0220222 A1* | 9/2007 | Boldt | H03M 7/3084 711/162 |
| 2008/0040647 A1 | 2/2008 | Zhidkow | |
| 2010/0135637 A1 | 6/2010 | McDermott et al. | |
| 2010/0185688 A1 | 7/2010 | Malinowski et al. | |
| 2011/0087640 A1 | 4/2011 | Dodd et al. | |
| 2013/0246444 A1 | 9/2013 | Ishihara et al. | |
| 2013/0279597 A1 | 10/2013 | Pearson | |
| 2014/0059017 A1 | 2/2014 | Chaney et al. | |

OTHER PUBLICATIONS

Chauvet et al., Managing Data Sets of a Storage System, U.S. Appl. No. 15/133,674, filed Apr. 20, 2016.
Accelerated Examination Support Document dated Apr. 15, 2016 for U.S. Appl. No. 15/133,674, 13 pages.
List of IBM Patents or Patent Applications Treated as Related, signed Apr. 19, 2016, 2 pages.

(Continued)

*Primary Examiner* — Kimberly L Wilson
(74) *Attorney, Agent, or Firm* — Nathan M. Rau

(57) ABSTRACT

A method, system, and computer program product for managing data sets of a storage facility is disclosed. The method, system, and computer program product include determining, by analyzing a first data set, that the first data set includes a first record having padded data. To identify the padded data, the method, system, and computer program product include comparing at least a portion of the first record of the first data set with a second record of a second data set. Next, the method, system, and computer program product include removing, from the first record of the first data set, the padded data.

16 Claims, 4 Drawing Sheets

(56) References Cited

OTHER PUBLICATIONS

Chauvet et al., Managing Data Sets of a Storage System, U.S. Appl. No. 15/352,247, filed Nov. 15, 2016.
Accelerated Examination Support Document dated Nov. 11, 2016 for U.S. Appl. No. 15/352,247, 14 pages.
Chauvet et al., Managing Data Sets of a Storage System, U.S. Appl. No. 15/352,326, filed Nov. 15, 2016.
Accelerated Examination Support Document dated Nov. 11, 2016 for U.S. Appl. No. 15/352,326, 14 pages.
List of IBM Patents or Patent Applications Treated as Related, signed Nov. 15, 2016, 2 pages.

* cited by examiner

MANAGING DATA SETS OF A STORAGE SYSTEM

TECHNICAL FIELD

This disclosure relates generally to computer systems and, more particularly, relates to managing data sets of a storage system.

BACKGROUND

The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure relate to a utility to determine whether padding has been used in data and then remove the padding. If backups exist, present data gets compared to backup data or a similar file to identify padding. If no backups exist, the present data gets scanned from end of the record and a search for padding characters occurs. Performance or efficiency benefits when recovering records may be provided.

The method, system, and computer program product include determining, by analyzing a first data set, that the first data set includes a first record having padded data. To identify the padded data, the method, system, and computer program product include comparing at least a portion of the first record of the first data set with a second record of a second data set. Subsequent to identifying the padded data, the method, system, and computer program product include removing, from the first record of the first data set, the padded data.

Aspects of the disclosure use techniques to identify padded characters that need to be removed from records and build a mask to assist in doing so. The records can be reset back to the correct length with the invalid padded data removed. The methodology can include comparing the current data to an older backup version of the data set. When a backup version of the data set is not available, records may be scanned in various ways. If a backup version of that particular file is not available, other application files related to the same application can also be scanned to see if the suspected mask pattern is part of the actual data in version of similar application data known to be valid/good.

DETAILED DESCRIPTION

Figure 1:
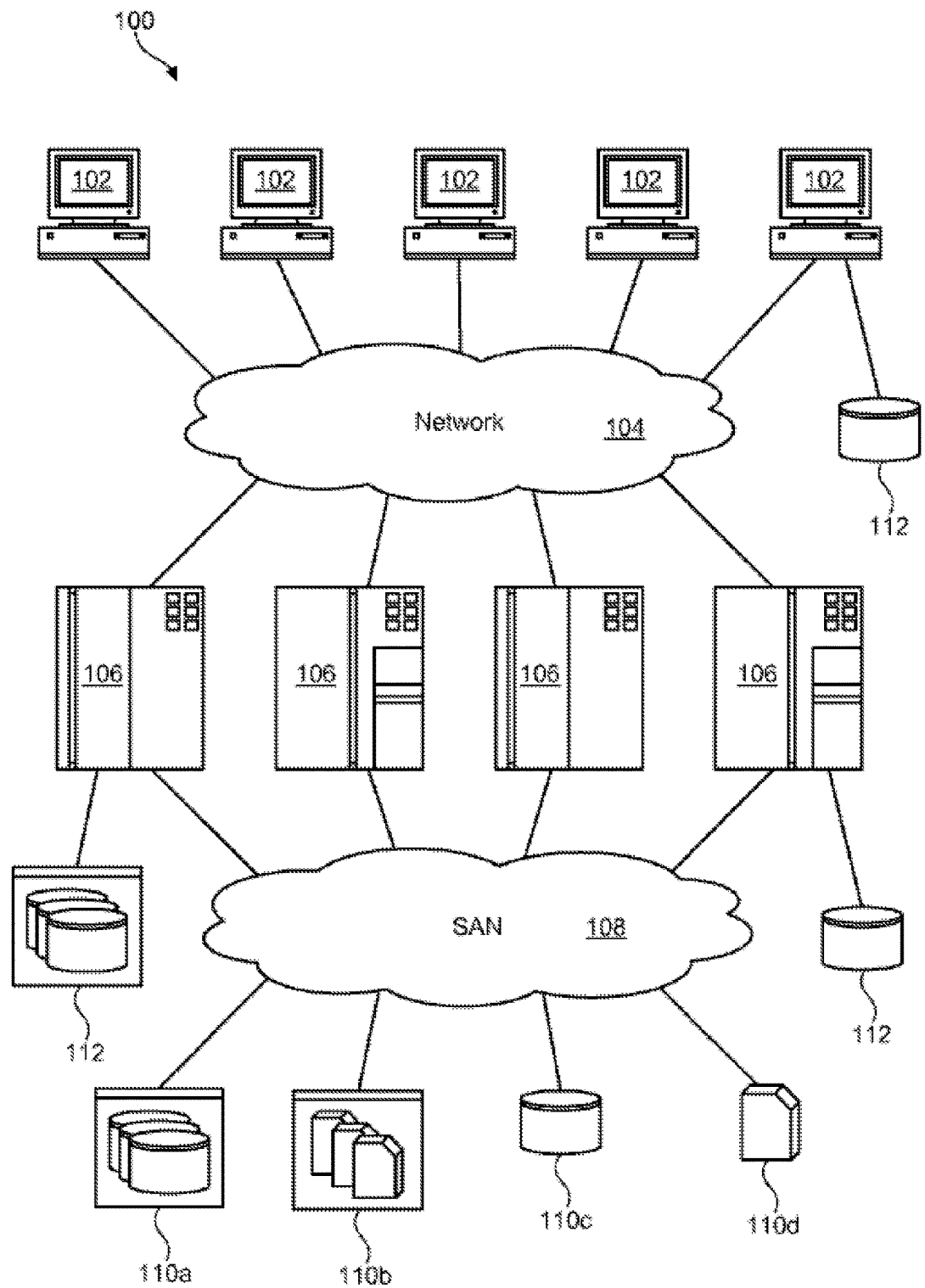
FIG. 1 illustrates an example network architecture according to embodiments.

Aspects of the disclosure relate to recovering data sets that have been damaged. Data sets can be corrupted in different ways. One way is through having the record length accidentally or inadvertently changed to be the wrong length. For applications that use variable length records, a user may accidentally convert the data into longer fixed length records. Such conversion can cause padded data to be added to the records. For those applications which are not anticipating padded characters, these records are no longer understandable by the application. If the user does not have a very current backup with a forward recovery method, the result can be lost data.

Aspects of the disclosure use techniques to identify padded characters that need to be removed from records and build a mask to assist in doing so. The records can be reset back to the correct length with the invalid padded data removed. The methodology can include comparing the current data to an older backup version of the data set. When a backup version of the data set is not available, records may be scanned in various ways. If a backup version of that particular file is not available, other application files related to the same application can also be scanned to see if the suspected mask pattern is part of the actual data in version of similar application data known to be valid/good.

Aspects of the disclosure include a method, system, and computer program product for managing data sets of a storage facility (i.e., storage system). The method, system, and computer program product may work on a number of operating systems. The method, system, and computer program product include determining, by analyzing a first data set, that the first data set includes a first record having padded data. To identify the padded data, the method, system, and computer program product include comparing at least a portion of the first record of the first data set with a second record of a second data set. Subsequent to identifying the padded data, the method, system, and computer program product include removing, from the first record of the first data set, the padded data.

Aspects of the disclosure include determining the first record is a fixed length record. In addition, it may be determined that the first record is expected to be a variable length record. The first record may be determined to have been converted to a fixed length record from a variable length record. In such instances, an application expecting to use a variable length record may face challenges in attempting to use the fixed length record.

In embodiments, aspects of the disclosure include determining the first data set is without a backup data set (no backup exists). At least the portion of the first record may be scanned in order to resolve a character pattern (e.g., scan back end to/toward front end until characters change, until reaching meaningful data, or until a character design stops). The character pattern may be stored as (potentially) the padded data. Using the first data set, the character pattern of the first record may be compared with the second record (e.g., comparing it with another record in the same data set to identify/determine/confirm padding/padding-pattern). A mask derived from the character pattern may be determined to match at least a segment of another/subsequent record of the same/first data set.

In embodiments, aspects of the disclosure include determining the second data set backs-up the first data set. In addition, it may be determined that both the first data set and the second data set include a type of record that is keyed. Using a key selected from the second data set (in embodiments, the backup data set), the first data set (in embodiments, the corrupted data set) may be searched for the key (e.g., looking for a particular identifier). Resulting from such search, it may be determined that the key in the second record matches a like key in the first record. At least the portion of the first record may be scanned in order to resolve a character pattern (e.g., scan back end to/toward front end for a segment which mismatches the corresponding record from the backup). The methodology may be used in embodiments for a substantial sample size in order to understand the padding algorithm being utilized and (thereafter) the character pattern may be stored as (potentially) the padded data (e.g., storing a mask derived from the character pattern to identify the padded data).

In embodiments, aspects of the disclosure include determining the second data set backs-up the first data set. In addition, it may be determined that both the first data set and the second data set include a type of record that is non-keyed. At least the portion of the first record may be scanned in order to resolve a segment other than a character pattern (e.g., find data to use as an identifier in place of a key). Using the segment from the first record of the first data set (in embodiments, the corrupted data set), the second data set (in embodiments, the backup data set) may be searched for the segment (e.g., the identifier). It may be determined that the segment in the first record matches a like segment in the second record. For certainty, at least the portion of the first record may be scanned in order to resolve a character pattern not present in the second record (e.g., scan back end to/toward front end for a segment which mismatches the corresponding record from the backup). To identify the padded data, a mask derived from the character pattern may be determined to represent a feature in which the first record mismatches the second record.

Aspects of the disclosure include deleting a segment of the first record matching a mask derived from a character pattern. In embodiments, a record length for the first record is updated (e.g., updating a fixed length record of 1050 bytes to a variable length record of 240 bytes). In certain embodiments, the first record is loaded without padded data into a temporary file with the first data set. An original file is stored with padded data as a retained file with the first data set. The temporary file is stored without padded data with a name of the original file. Aspects of the disclosure provide a methodology for managing data sets in a storage system that may provide performance or efficiency benefits when recovering records.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit the storage pools of storage systems 110, 112 to recover from data found to be corrupt. Therefore, the methodology provided may allow for recovery from data corruption in relation to the example network architecture 100 illustrated by FIG. 1.

Figure 2:
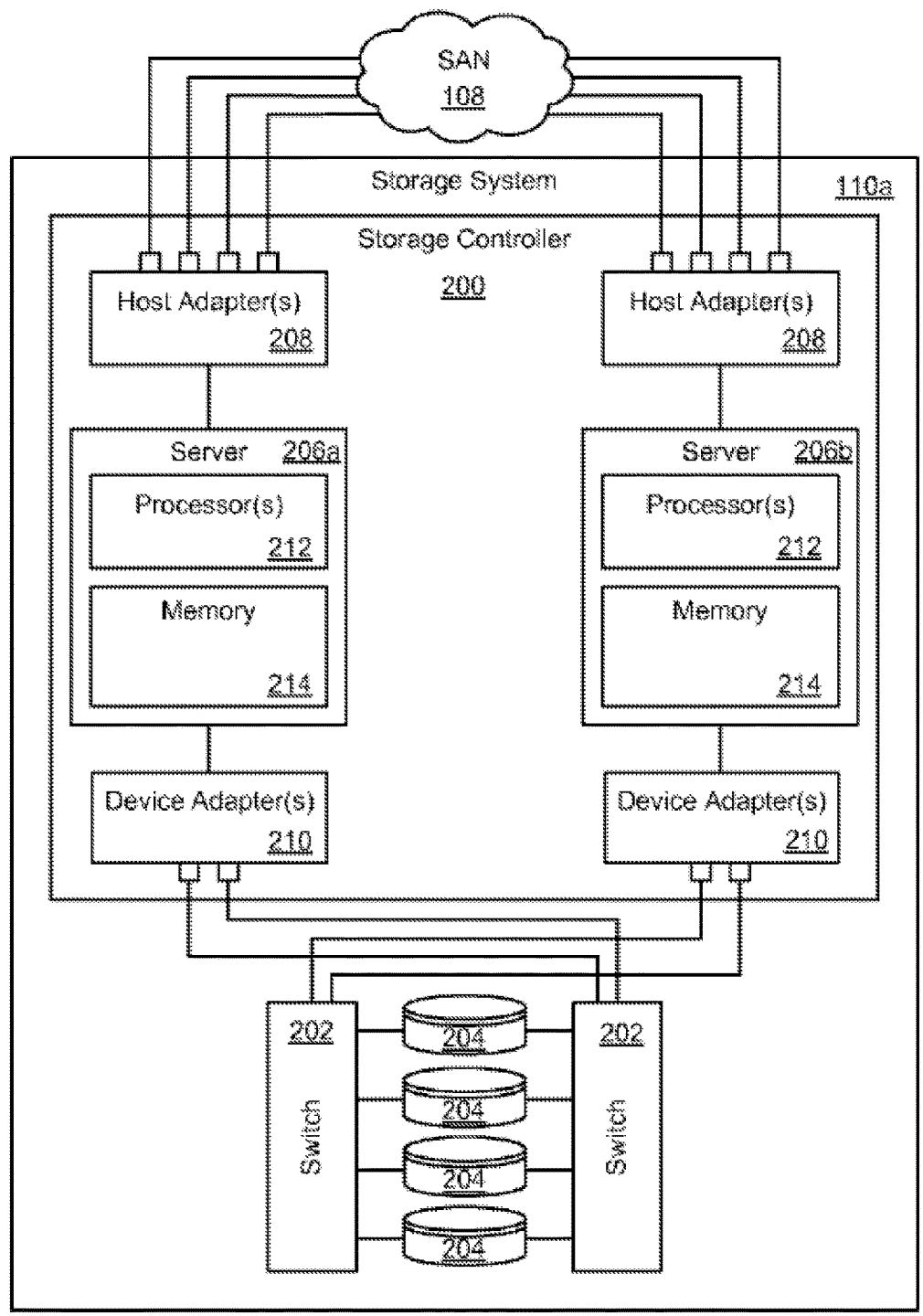
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit the storage devices 204 to recover from data found to be corrupt. Therefore, the methodology provided may allow for recovery from data corruption in relation to the example storage system 110a containing an array of storage devices 204 illustrated by FIG. 2.

Figure 3:
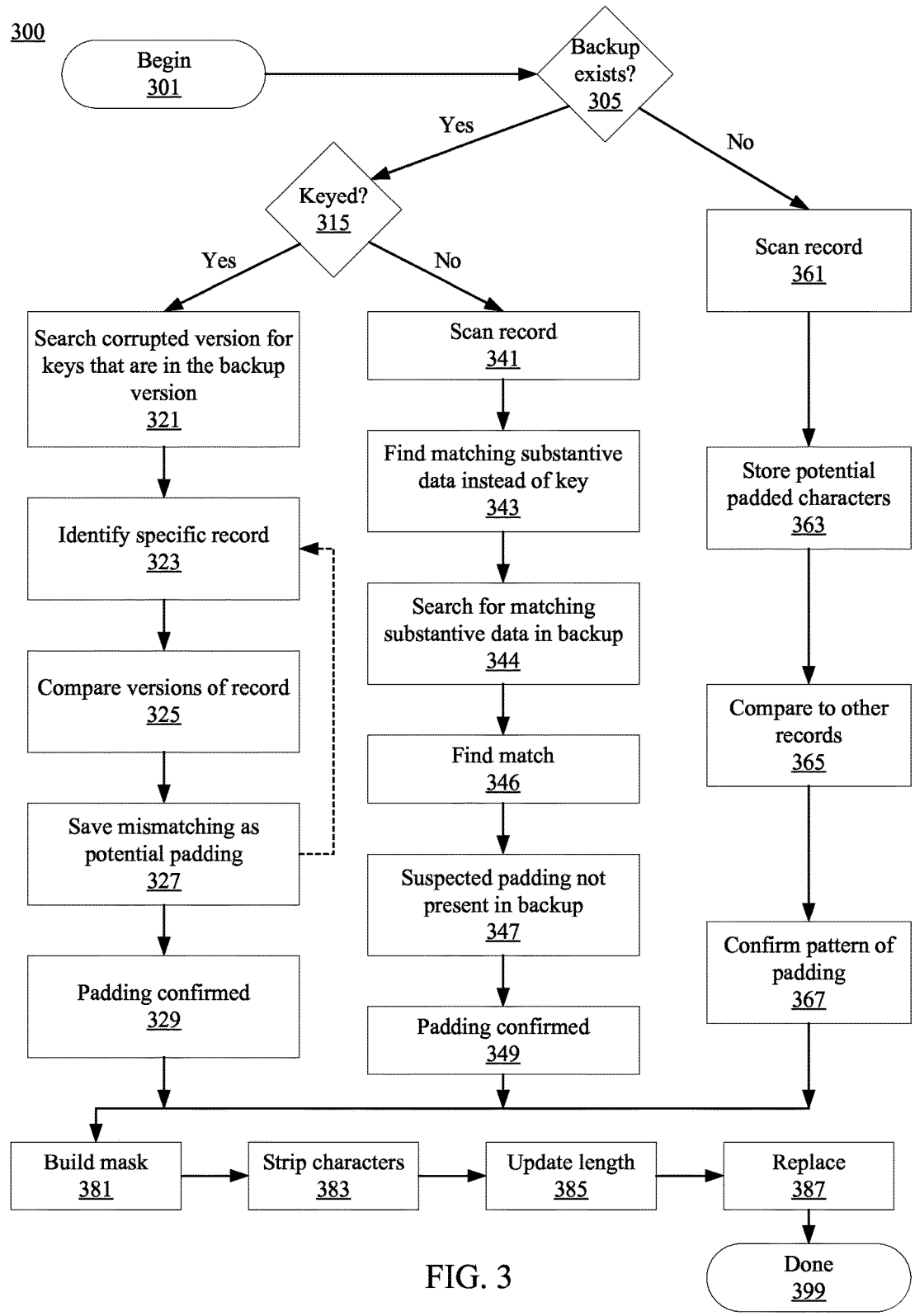
FIG. 3 is a flowchart illustrating a method for managing data sets of a storage system according to embodiments.

FIG. 3 is a flowchart illustrating a method 300 for managing data sets of a storage system according to embodiments. The method includes determining, by analyzing a first data set, that the first data set includes a first record having padded data. To identify the padded data (padding characters used), the method includes comparing at least a portion of the first record of the first data set with a second record of a second data set. In response to identifying the padded data, the method includes removing, from the first record of the first data set, the padded data. Method 300 may begin at block 301.

It may be determined that the first record: is a fixed length record, is expected to be a variable length record, or has been converted to a fixed length record from a variable length record. When record lengths are increased through sort applications or other user programs, the previously unused segment of the record may be filled with some type of data or left as zeros. Common padding characters such as blank spaces which translate into x'40' can sometimes be used. Common backup products such as can be scanned for backup version of the data set at block 305. If found, the most recent backup version may be recovered for use in comparison with the potential corrupt version.

For backed-up data sets at block 305 (e.g., the second data set backs-up the first data set) with keyed records at block 315 (e.g., both the first data set and the second data set include a type of record that is keyed—keyed records can be unique identifiers that precede data in a record where variable data follows; examples include numeric values, transaction identifiers, account numbers, etc.), a search through the corrupted file for keys found in the backup version of the file may be performed at block 321. Once a specific record is identified at block 323 (e.g., determined that the key in the second record matches a like key in the first record), the records may be compared (scan back end to/toward front end for a segment which mismatches the corresponding record from the backup) at block 325. The area of the data that does not match may be saved as a potential padded area at block 327. Many records within the data set can be compared in this way (shown as dotted line) until the padding can be confirmed at block 329. This allows aspects of the disclosure to differentiate the padding from updated areas of a record by comparing numerous records. Those areas at the end that are common throughout the compared records can be used as the padding characters (character pattern) in the mask generated at block 381 to repair the data set.

For backed-up data sets at block 305 (e.g., the second data set backs-up the first data set) without keys (non-keyed) at block 315, at least a portion of the first record may be scanned in order to resolve a segment other than a character pattern (e.g., find data to use as an identifier in place of a key) at block 341. That segment (from the first record) which is not the character pattern (e.g., does not appear to match the pattern of a mask but is instead more substantive data in order to be used as the identifier) at block 343, may be searched for in the backup version of the data at block 344. It may be determined that the segment in the first record matches a like segment in the second record (e.g., when a match is found) at block 346, and the suspected mask area is not present in the backup version of the record at block 347, this can be used as confirmation of the padded area data at block 349. For certainty, at least the portion of the first record may be scanned in order to resolve a character pattern not present in the second record (e.g., scan back end to/toward front end for a segment which mismatches the corresponding record from the backup). To identify the padded data, at block 381 a mask derived from the character pattern may be determined to represent a feature in which the first record mismatches the second record.

For those data sets without a backup at block 305, the records are scanned at block 361 in order to resolve a character pattern (e.g., scan back end to/toward front end until characters change, until reaching meaningful data, or until a character design stops—character designs could be ABCDEFG, 1234567, etc.). Since earlier versions of the record are not available to use for comparison purposes, the potential padded characters identified may be stored at block 363 for (each) record analyzed. Using the first data set, the character pattern of the first record may be compared with the second record (e.g., comparing it with another record in the same data set to identify/determine/confirm padding/padding-pattern) at block 365 until a pattern can be confirmed at block 367. A mask derived from the character pattern can be determined/constructed to match at least a segment of another/subsequent record of the same/first data set at block 381. For example, for blanks spaces in the record the mask may be x'40'.

After the mask has been identified/built at block 381, each record can be modified by stripping off at block 383 those characters in (at the end of) the record that match the mask. The record length can be updated (e.g., updating a fixed length record of 1050 bytes to a variable length record of 240 bytes) at block 385 to reflect the actual size of the record without any padded data. To begin replacement at block 387, these records may be loaded into a new temporary named version of the file. Once completed, the corrupt/bad file can be renamed (and retained) in case any additional analysis of the data is requested. The recovered version of the data set may be renamed back to the original file name.

Method 300 may conclude at block 399. Aspects of method 300 may provide performance or efficiency benefits when recovering records. Altogether, a storage system may be managed more efficiently.

Figure 4:
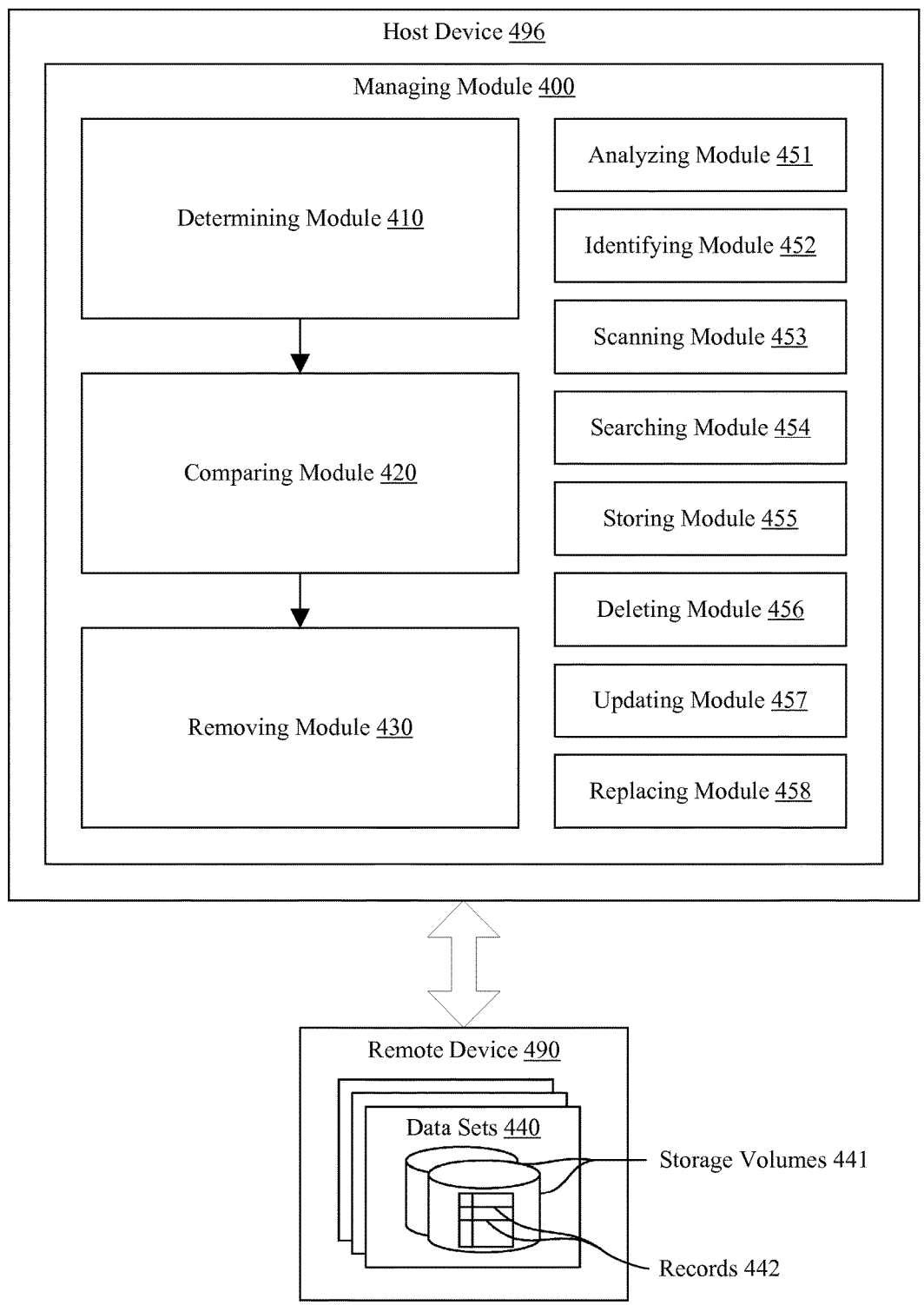
FIG. 4 shows modules of a system for managing data sets according to embodiments.

FIG. 4 shows modules of a system for managing data sets according to embodiments. In embodiments, method 300 may be implemented using one or more modules of FIG. 4. These modules may be implemented in hardware, software or firmware executable on hardware, or a combination thereof. For example, module functionality that may occur in a host device 496 may actually be implemented in a remote device 490 and vice versa. Other functionality may be distributed across the host device 496 and the remote device 490.

The host device 496 may include a managing module 400. The managing module 400 may be configured and arranged to manage a storage facility. The managing module 400 may include a determining module 410, a comparing module 420, a removing module 430, an analyzing module 451, an identifying module 452, a scanning module 453, a searching module 454, a storing module 455, a deleting module 456, an updating module 457, and a replacing module 458. The remote device 490 may have data sets 440 comprising storage volumes 441 having records 442.

The determining module 410 determines, by analyzing a first data set (which may occur using the analyzing module 451), that the first data set includes a first record having padded data. To identify the padded data, the comparing module 420 compares at least a portion of the first record of the first data set with a second record of a second data set. Subsequent to identifying the padded data (which may occur with assistance from the identifying module 452), the removing module 430 removes, from the first record of the first data set, the padded data.

The determining module 410 can, in certain embodiments, include determining the first record is a fixed length record. In addition, it may determine that the first record is expected to be a variable length record. The first record may be determined by the determining module 410 to have been converted to a fixed length record from a variable length record. In such instances, an application expecting to use a variable length record may face challenges in attempting to use the fixed length record. The analyzing module 451 may be used (or assist) for such operations.

In embodiments, the determining module 410 may determine that the first data set is without a backup data set (no backup exists). At least the portion of the first record may be scanned by the scanning module 453 in order to resolve a character pattern (e.g., scan back end to/toward front end until characters change, until reaching meaningful data, or until a character design stops). The character pattern may be stored as (potentially) the padded data using the storing module 455. Using the first data set, the character pattern of the first record may be compared with the second record using the comparing module 420 (e.g., comparing it with another record in the same data set to identify/determine/confirm padding/padding-pattern). A mask derived from the character pattern may be determined to match at least a segment of another/subsequent record of the same/first data set using at least one of the determining module 410, the comparing module 420, or the storing module 455.

In embodiments, the determining module 410 may determine the second data set backs-up the first data set. In addition, the determining module 410 may determine that both the first data set and the second data set include a type of record that is keyed. Using a key selected from the second data set (in embodiments, the backup data set), the first data set (in embodiments, the corrupted data set) may be searched for the key using the searching module 454 (e.g., looking for a particular identifier). Resulting from such search, it may be determined that the key in the second record matches a like key in the first record. At least the portion of the first record may be scanned using the scanning module 453 in order to resolve a character pattern (e.g., scan back end to/toward front end for a segment which mismatches the corresponding record from the backup). The methodology may be used in embodiments for a substantial sample size in order to understand the padding algorithm being utilized and (thereafter) the character pattern may be stored as (potentially) the padded data using the storing module 455 (e.g., storing a mask derived from the character pattern to identify the padded data).

In embodiments, the determining module 410 may determine the second data set backs-up the first data set. In addition, the determining module 410 may determine that both the first data set and the second data set include a type of record that is non-keyed. At least the portion of the first record may be scanned using the scanning module 453 in order to resolve a segment other than a character pattern (e.g., find data to use as an identifier in place of a key). Using the segment from the first record of the first data set (in embodiments, the corrupted data set), the second data set (in embodiments, the backup data set) may be searched for the segment (e.g., the identifier) using the searching module 454. It may be determined that the segment in the first record matches a like segment in the second record. For certainty, at least the portion of the first record may be scanned using the scanning module 453 in order to resolve a character pattern not present in the second record (e.g., scan back end to/toward front end for a segment which mismatches the corresponding record from the backup). To identify the padded data by the identifying module 452, a mask derived from the character pattern may be determined to represent a feature in which the first record mismatches the second record.

The deleting module 456 may delete a segment of the first record matching a mask derived from a character pattern. In embodiments, a record length for the first record is updated using the updating module 457 (e.g., updating a fixed length record of 1050 bytes to a variable length record of 240 bytes). A replacing module 458 may replace the old corrupted information with the newly certified correct information. As such, in certain embodiments, the first record is loaded without padded data into a temporary file with the first data set. An original file is stored with padded data as a retained file with the first data set. The temporary file is stored without padded data with a name of the original file.

Aspects of managing module 400 may provide performance or efficiency benefits when recovering records. The module(s) may serve as a utility to determine whether padding has been used in data and then remove the padding. If backups exist, present data gets compared to backup data or a similar file to identify padding. If no backups exist, the present data gets scanned from end of the record and a search for padding characters occurs. In embodiments, a user is presented a verification console before removing padding in order to certify the operation is to occur. Altogether, a storage facility may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method for managing data sets of a storage system by repairing a data set that includes padded data such that the data set can be read by an application that cannot read a data set including padded data, the method comprising:
   determining, by analyzing a first data set, that the first data set includes a first record having padded data, wherein padded data represents data added to a record to make a variable length record a fixed length record;
   comparing, to identify the padded data, at least a portion of the first record of the first data set with a second record of a second data set; and
   removing, from the first record of the first data set, the padded data identified in response to comparing at least the portion of the first record of the first data set with the second record of the second data set wherein the removing includes:
   deleting a segment of the first record matching a mask derived from a character pattern, and
   updating a record length for the first record;
   loading the first record, without padded data, into a temporary file with the first data set;
   storing an original file, with padded data, as a retained file with the first data set;
   storing the temporary file, without padded data, with a name of the original file; and
   accessing the temporary file by the application, wherein the application could not read the first record with padded data.

2. The method of claim 1, wherein determining, by analyzing the first data set, that the first data set includes the first record having padded data includes:
   determining the first record is a fixed length record.

3. The method of claim 2, further comprising:
   determining the first record is expected to be a variable length record.

4. The method of claim 1, wherein determining, by analyzing the first data set, that the first data set includes the first record having padded data includes:
   determining the first record has been converted to a fixed length record from a variable length record.

5. The method of claim 1, wherein determining, by analyzing the first data set, that the first data set includes the first record having padded data includes:
   determining the first data set is without a backup data set; and
   scanning at least the portion of the first record to resolve a character pattern.

6. The method of claim 5, wherein comparing, to identify the padded data, at least the portion of the first record of the first data set with the second record of the second data set includes:
   comparing the character pattern of the first record of the first data set with the second record of the second data set, wherein the second data set is the first data set and the first record is different from the second record.

7. The method of claim 6, wherein:
   scanning at least the portion of the first record for the character pattern includes scanning from a back end of the first record toward a front end of the first record until the character pattern stops; and
   comparing, to identify the padded data, at least the portion of the first record of the first data set with the second record of the second data set includes storing the character pattern and determining a mask derived from the character pattern matches at least a segment of a subsequent record of the first data set.

8. The method of claim 1, wherein determining, by analyzing the first data set, that the first data set includes the first record having padded data includes:
   determining the second data set backs-up the first data set; and
   determining that both the first data set and the second data set include a type of record that is keyed.

9. The method of claim 8, wherein comparing, to identify the padded data, at least the portion of the first record of the first data set with the second record of the second data set includes:
   searching, using a key from the second data set, the first data set for the key; and
   determining the key in the second record matches a like key in the first record.

10. The method of claim 9, wherein comparing, to identify the padded data, at least the portion of the first record of the first data set with the second record of the second data set includes:
    scanning from a back end of the first record toward a front end of the first record to resolve a character pattern configured to identify the padded data as a segment which mismatches the second record; and
    storing a mask derived from the character pattern to identify the padded data.

11. The method of claim 1, wherein determining, by analyzing the first data set, that the first data set includes the first record having padded data includes:
  determining the second data set backs-up the first data set;
  determining that both the first data set and the second data set include a type of record that is non-keyed; and
  scanning at least the portion of the first record to resolve a segment other than a character pattern.

12. The method of claim 11, wherein comparing, to identify the padded data, at least the portion of the first record of the first data set with the second record of the second data set includes:
  searching, using the segment from the first record of the first data set, the second data set for the segment; and
  determining the segment in the first record matches a like segment in the second record.

13. The method of claim 12, wherein comparing, to identify the padded data, at least the portion of the first record of the first data set with the second record of the second data set includes:
  scanning at least the portion of the first record to resolve the character pattern; and
  determining, to identify the padded data, a mask derived from the character pattern represents a feature in which the first record mismatches the second record.

14. A system for managing data sets in a storage facility, comprising:
  a remote device; and
  a host device, at least one of the remote device and the host device including a managing module, the managing module comprising:
    a determining module to determine, by analyzing a first data set, that the first data set includes a first record having padded data, wherein padded data represents data added to a record to make a variable length record a fixed length record;
    a comparing module to compare, to identify the padded data, at least a portion of the first record of the first data set with a second record of a second data set; and
    a removing module to remove, from the first record of the first data set, the padded data identified in response to comparing at least the portion of the first record of the first data set with the second record of the second data set; wherein removing includes;
      deleting a segment of the first record matching a mask derived from a character pattern, and
      updating record length for the first record;
      loading the first record, without padded data, into a temporary file with the first data set;
      storing an original file, with padded data, as a retained file with the first data set;
      storing the temporary file, without padded data, with a name of the original file; and
      accessing the temporary file by the application, wherein the application could not read the first record with padded data.

15. A computer program product comprising a computer readable storage medium having a computer readable program stored therein, wherein the computer readable program, when executed on a first computing device, causes the first computing device to:
  determine, by analyzing a first data set, that the first data set includes a first record having padded data, wherein the padded data was added to the first record by converting the first record from a variable length record to a fixed length record;
  compare, to identify the padded data, at least a portion of the first record of the first data set with a second record of a second data set; and
  remove, from the first record of the first data set, the padded data identified in response to comparing at least the portion of the first record of the first data set with the second record of the second data set; wherein removing includes;
  deleting a segment of the first record matching a mask derived from a character pattern, and
  update updating a record length for the first record;
  loading, the first record, without padded data, into a temporary tide with the first data set;
  store an original file, with padded data, as a retained file with the first data set;
  storing the temporary file, without padded data, with a name of the original file; and
  access the temporary file by the application, wherein the application could not read the first record with padded data.

16. The computer program product of claim 15 wherein determine, by analyzing the first data set, that the first data set includes the first record having padded data includes:
  determining the first data set is without a backup data set; and
  scanning at least the portion of the first record to resolve a character pattern.

* * * * *